US008410977B2

(12) United States Patent
Rowen et al.

(10) Patent No.: US 8,410,977 B2
(45) Date of Patent: Apr. 2, 2013

(54) METHODS AND SYSTEMS FOR IDENTIFYING HAZARDOUS FLIGHT ZONE AREAS ON A DISPLAY

(75) Inventors: Rodney A. Rowen, Redmond, WA (US); Brian P. Bunch, Snohomish, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/029,923

(22) Filed: Feb. 17, 2011

(65) Prior Publication Data
US 2012/0212367 A1 Aug. 23, 2012

(51) Int. Cl.
*G01S 7/04* (2006.01)
*G01S 13/95* (2006.01)

(52) U.S. Cl. ............... 342/176; 342/26 R; 342/26 B; 342/175; 342/195; 340/945; 345/418; 345/441

(58) Field of Classification Search ....... 342/26 R–26 D, 342/175–173, 192–197, 175–183; 340/945; 345/418–428, 441–443, 581, 582, 587
See application file for complete search history.

(56) References Cited

U.S. PATENT DOCUMENTS

| 4,855,934 | A | * | 8/1989 | Robinson | 345/419 |
|---|---|---|---|---|---|
| 5,123,085 | A | * | 6/1992 | Wells et al. | 345/421 |
| 5,305,431 | A | * | 4/1994 | Cyr et al. | 345/443 |
| 5,341,463 | A | * | 8/1994 | Wescott et al. | 345/441 |
| 5,343,558 | A | * | 8/1994 | Akeley | 345/421 |
| 5,347,618 | A | * | 9/1994 | Akeley | 345/421 |
| 5,363,107 | A | * | 11/1994 | Gertz et al. | 342/26 B |
| 5,475,802 | A | * | 12/1995 | Wescott et al. | 345/441 |
| 5,528,737 | A | * | 6/1996 | Sfarti | 345/441 |
| 5,694,531 | A | * | 12/1997 | Golin et al. | 345/419 |
| 5,734,386 | A | * | 3/1998 | Cosman | 345/587 |
| 5,805,170 | A | * | 9/1998 | Burch | 345/441 |
| 5,818,456 | A | * | 10/1998 | Cosman et al. | 345/421 |
| 5,850,225 | A | * | 12/1998 | Cosman | 345/427 |
| 6,031,540 | A | * | 2/2000 | Golin et al. | 345/419 |
| 6,043,756 | A | * | 3/2000 | Bateman et al. | 340/945 |
| 6,055,337 | A | | 4/2000 | Kim | |
| 6,212,132 | B1 | * | 4/2001 | Yamane et al. | 342/179 |
| 6,289,277 | B1 | | 9/2001 | Feyereisen et al. | |
| 6,621,451 | B1 | * | 9/2003 | Fisher et al. | 342/176 |

(Continued)

OTHER PUBLICATIONS

Ahlstrom & Jaggar, Automatic identification of risky weather objects in line of flight (AIRWOLF), Transportation Research Part C 18 (2010), pp. 187-192, published by Elsevier Ltd.

(Continued)

*Primary Examiner* — Bernarr Gregory
(74) *Attorney, Agent, or Firm* — Lowe Graham Jones PLLC

(57) ABSTRACT

Systems and methods for representing a weather hazard without also including a large percentage of non-hazard area. An exemplary system includes a memory that stores radar reflectivity data in a three-dimensional buffer, a display device and a processor that is in data communication with the memory and the display device. The processor receives a two-dimensional shape based on a portion of the data stored in the three-dimensional buffer, then finds a center of the shape. Next the processor finds the furthest away point of the shape in a plurality of regions sharing the center as a common point and generates a polygon based on the furthest away points. The display device displays the generated polygon. The shape is associated with hazardous weather information determined from the radar reflectivity data stored in the three-dimensional buffer. The display device is an aircraft weather radar display.

18 Claims, 4 Drawing Sheets

U.S. PATENT DOCUMENTS

| | | | |
|---|---|---|---|
| 6,744,382 | B1 | 6/2004 | Lapis et al. |
| 6,828,922 | B1 * | 12/2004 | Gremmert et al. .......... 342/26 B |
| 7,075,766 | B2 | 7/2006 | Moyer et al. |
| 7,375,678 | B2 * | 5/2008 | Feyereisen et al. ........... 342/180 |
| 7,391,335 | B2 | 6/2008 | Mubaslat et al. |
| 2003/0085887 | A1 | 5/2003 | Hunt et al. |
| 2003/0165258 | A1 | 9/2003 | Kubota et al. |
| 2008/0204029 | A1 | 8/2008 | Mihai et al. |
| 2008/0231198 | A1 | 9/2008 | Zarr |

OTHER PUBLICATIONS

Jeffrey L. Gertz, The Polygon-ellipse method of data compression of weather maps, DOT/FAA/RD-94/6, Project Report ATC-213, Lincoln Laboratory, Massachusetts Institute of Technology, Lexington, MA, Mar. 28, 1994.

Daryal Kuntman, Airborne system to address leading cause of injuries in non-fatal airline accidents, ICAO Journal, vol. 55, No. 2, Mar. 2000, pp. 11-12, 27.

* cited by examiner

METHODS AND SYSTEMS FOR IDENTIFYING HAZARDOUS FLIGHT ZONE AREAS ON A DISPLAY

BACKGROUND OF THE INVENTION

Weather radar system algorithms were developed to determine hazardous flight zone areas. One solution for indicating a hazardous area to the pilot was to surround the area in question with a series of connected lines. One option is a simple box that surrounds the hazardous area, but it may include a lot of area that is not hazardous and therefore would be safe to fly in. A second option is to draw an outline around the area, but that can make an overly complicated shape that may be constantly changing shape as the airplane or weather changes over time.

Another technique uses simplified polygons. Current simplified polygon techniques suggest a recursive tracing algorithm. The first step is to trace the outline of the object. Then a recursive algorithm checks each outline point with other points on the outline to see if a new line can be added that creates a simplified outline. This requires running an algorithm to compute a value for each line to determine how much it simplifies the shape. These comparisons along with the recursion make this a very computational intensive algorithm.

SUMMARY OF THE INVENTION

The present invention marks the areas of hazard without also including a large percentage of non-hazard area. The present invention makes the boundaries stand out without overstating the hazardous zone.

An exemplary system includes a memory that stores radar reflectivity data in a three-dimensional buffer, a display device and a processor that is in data communication with the memory and the display device. The processor generates a two-dimensional image based on data in the three-dimensional buffer, then it finds centers of any shapes in the image. Next the processor finds the furthest away point of each shape in a plurality of regions sharing the center as a common point and generates a polygon based on the furthest away points. The display device displays the generated polygons for the shapes.

In one aspect of the invention, the shape is associated with hazardous weather information determined from the radar reflectivity data stored in the three-dimensional buffer. The display device is an aircraft weather radar display.

In another aspect of the invention, the processor connects lines between the furthest away points of adjacent regions to generate the polygon.

In still another aspect of the invention, the processor finds at least two furthest away points of the shape in each of the plurality of regions.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
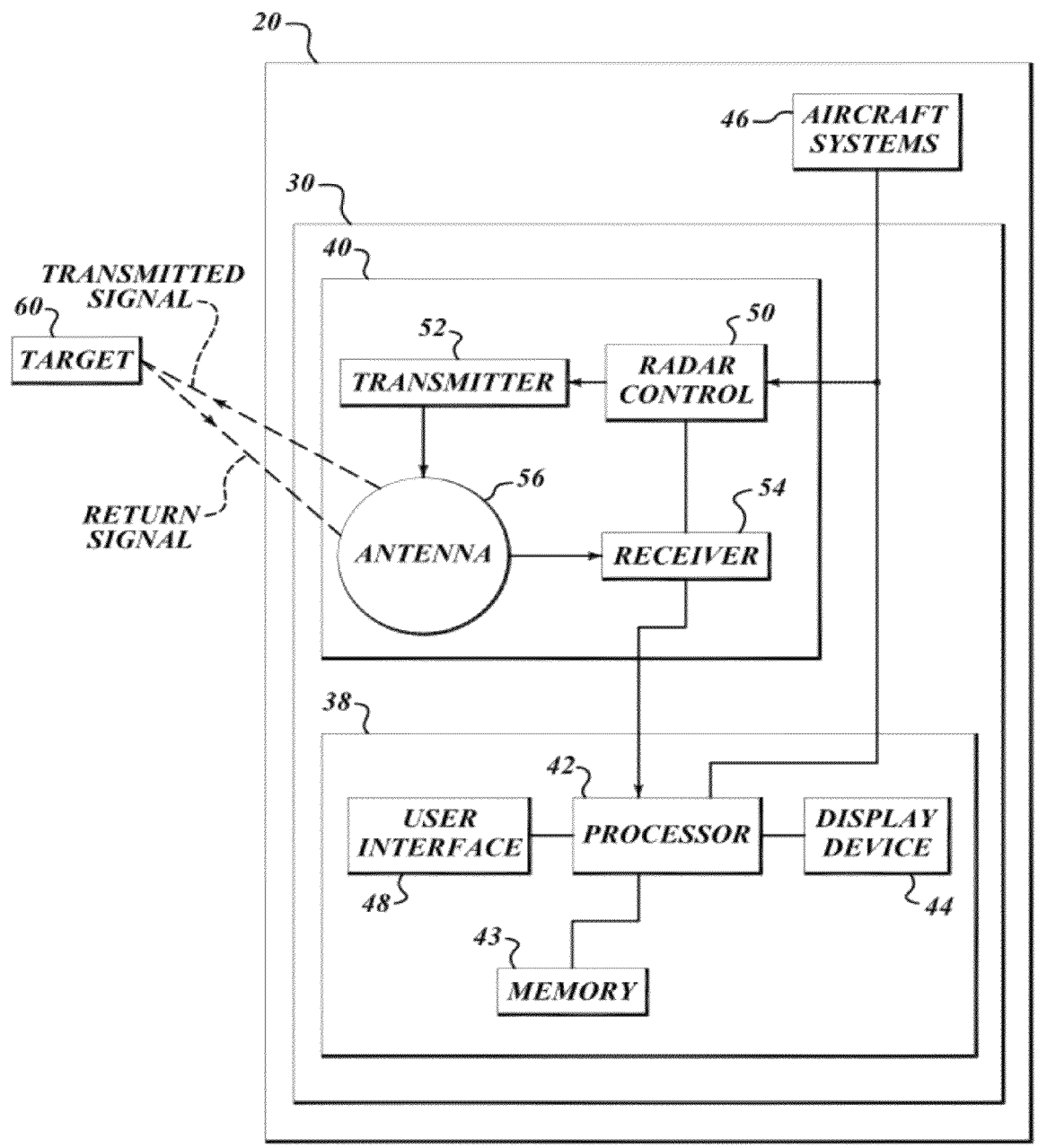
FIG. 1 is a block diagram of an exemplary system formed in accordance with an embodiment of the present invention.

FIG. 1 illustrates an example system 30 implemented on an aircraft 20 for providing more accurate flight plan/path weather information. The system 30 includes a weather radar system 40 and a radar display system 38 that includes a display processor 42, memory 43, a display device 44, and a user interface device 48. The aircraft 20 also includes other aircraft systems 46, such as an air data computer (ADC), that are in signal communication with the weather radar system 40 and the radar display system 38. The display processor 42 is electrically coupled to the radar system 40, the display device 44, the other aircraft systems 46, the user interface device 48 and the memory 43. The radar system 40 includes a radar controller 50, a transmitter 52, a receiver 54 and an antenna 56. The radar controller 50 controls the transmitter 52 and the receiver 54 for performing the transmitting and receiving of signals through the antenna 56 based on the selected radar mode and other pilot inputs received from the user interface 48, and aircraft data (i.e., altitude, speed, position, heading, roll, yaw, pitch, etc.) received from the ADC, a Flight Management System (FMS), Inertial Navigation System (INS), and/or Global Positioning System (GPS) (the other aircraft systems 46).

The radar system 40 transmits radar signals from the transmitter 52, directs the transmitted radar signals into space by the antenna 56 and detects return signals with the receiver 54 if a target 60 is present to scatter energy associated with the directed radar signal back to the receiver 54. Preferably, the radar system 40 digitizes the return signals and sends the digitized signals to the display processor 42. The display processor 42 translates the received return signals for storage in a multi-dimensional buffer in the memory 43. The display processor 42 then generates a two (or three)-dimensional image for presentation on the display device 44 based on any control signals sent from the user interface device 48 or based on signals from the radar system 40.

U.S. patent application Ser. No. 12/640,976 filed Dec. 12, 2009 to Christianson, which is hereby incorporated by reference, discloses a method for discriminating between threatening and non-threatening weather using a Vertically Integrated Reflectivity (VIR) calculation.

VIR data includes the sum of reflectivity values stored in a column of cells in the three-dimensional buffer or an integration of the values in the column of cells. The processor 42 vertically integrates the product of reflectivity values and altitude, each raised to some power.

In one embodiment, the processor 42 first identifies zero or more groups or shapes associated with hazardous weather based on a display request. If a shape exists, the processor 42 then places each point of each identified shape (associated hazardous cells) into one of several regions or quadrants based on a center of the shape. Then, the processor 42 finds in each region/quadrant the point that was farthest away from the center. The outlying points in each of the regions/quadrants are then connected with lines resulting in a simplified polygon that surrounds the shape.

Figure 2:
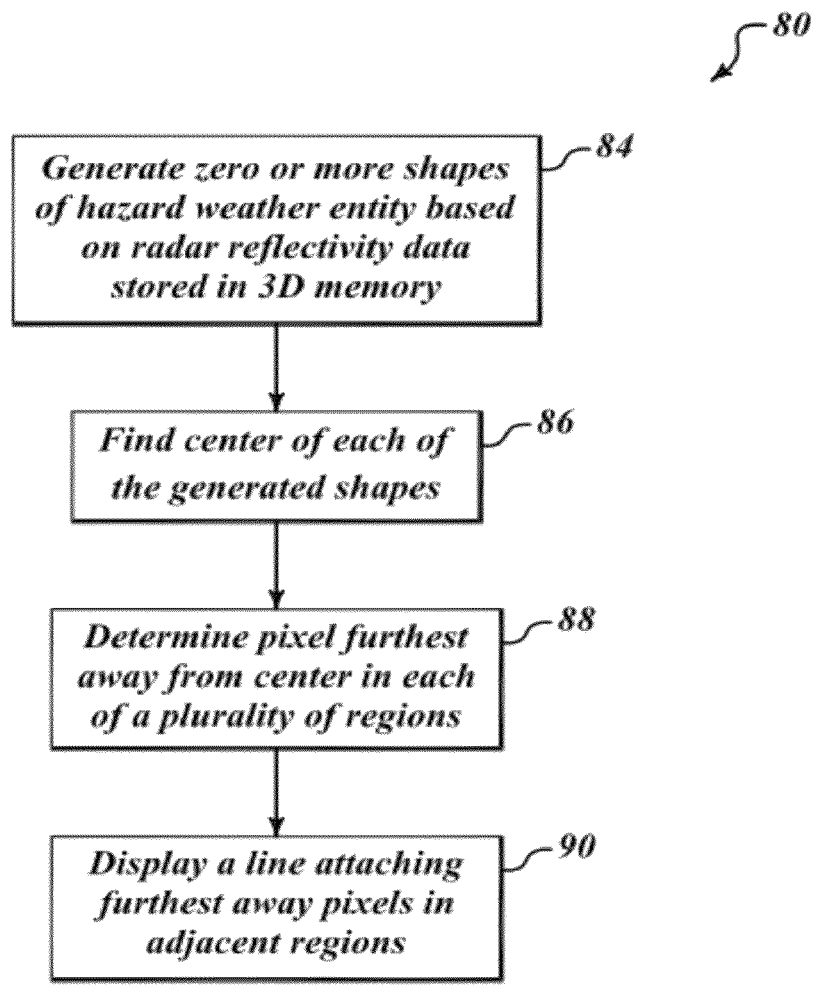
FIGS. 2 and 3 are flow diagrams showing exemplary processes performed by the system shown in FIG. 1.

FIG. 2 illustrates a process 80 for surrounding or more simply representing a hazardous weather image as a polygon. First, at a block 84, zero or more hazardous weather entity shapes are generated from radar source data stored in a three-dimensional buffer. The hazardous weather shape includes a plurality of pixels all being associated with radar reflectivity data located in a three-dimensional buffer that is identified as hazardous weather (i.e., based on VIR or other calculations). Next, at a block 86, a center of each hazardous weather shape is determined. At a block 88, in each of a plurality of regions or quadrants the pixels of the hazardous weather shape that are furthest away from the center are determined. Finally, at a block 90, the pixels determined to be the furthest away are connected to other furthest away pixels in adjacent regions/quadrants to create a polygon that is presented on the display instead of the shape.

Figure 3:
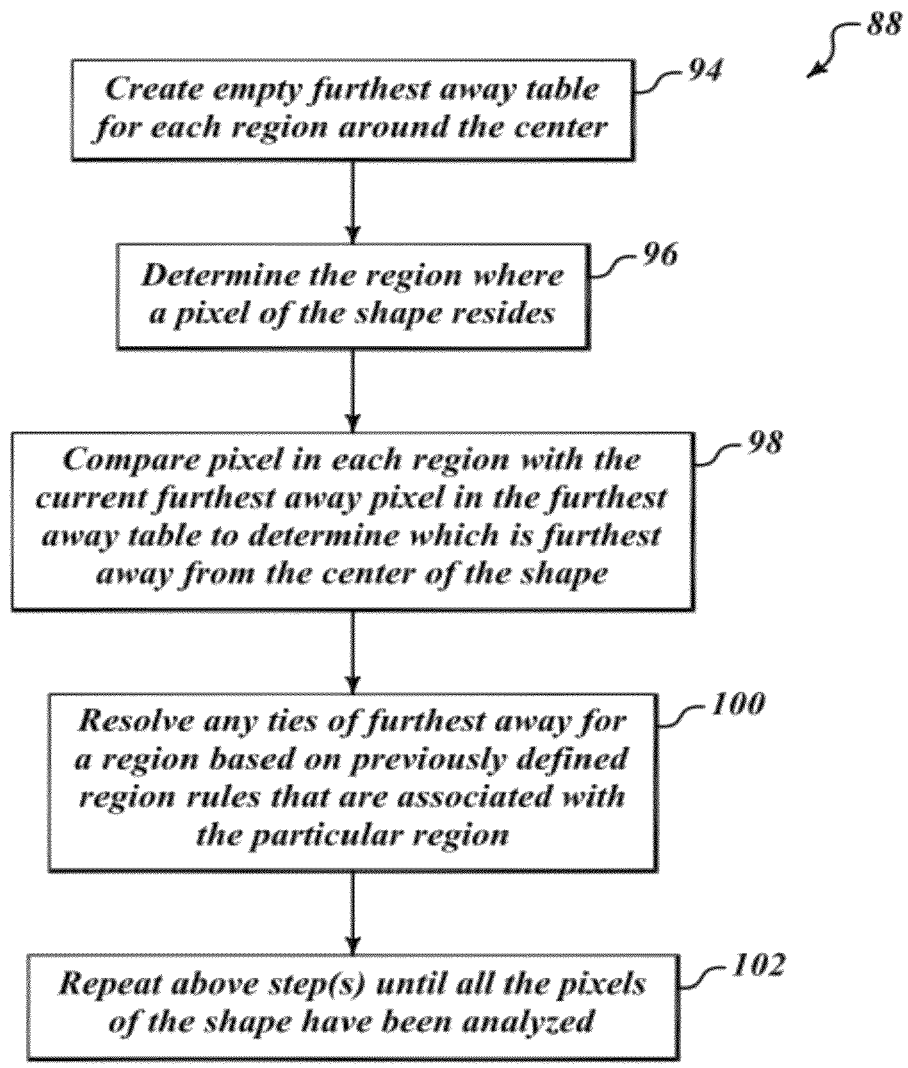

FIG. 3 illustrates an example of the process performed at the block 88 of FIG. 2. First, at a block 94, an empty furthest away table entry is created for each region. At block 96, the pixel location is examined to determine in which of the eight regions it resides in. Next, at a block 98, in each region the pixels of the shape are compared with the current furthest pixel away in the furthest away table to determine which is furthest away from the center. The furthest away table is updated at this time. At a block 100, any ties of furthest away for a region are resolved based on previous rules that are associated with the particular region. At block 102 the steps above are repeated until all the pixels of the shape have been analyzed.

The advantage of the present invention is that it is very fast and requires a consistent amount of processing time. The shapes are stored effectively in a two-dimensional array. In one embodiment, the data for the shapes is collected from a couple sources (e.g., turbulence data or VIR data) which are then processed into a 2D buffer. Therefore every point is either part of the shape or not. The center of mass can be determined simply by adding the X's and Y's of every point in the object and dividing by the number of points in the object.

In the next step, comparisons against the center point are used to determine which of the 8 quadrants the point lies in. While any number of quadrants could be used 8 was selected because of the simplicity and speed. A simple min/max comparison is done against the previous selected outlying point for a particular quadrant.

In one embodiment, the two furthest points in each region are selected as part of the surrounding polygon instead of the just one point.

Figure 4:
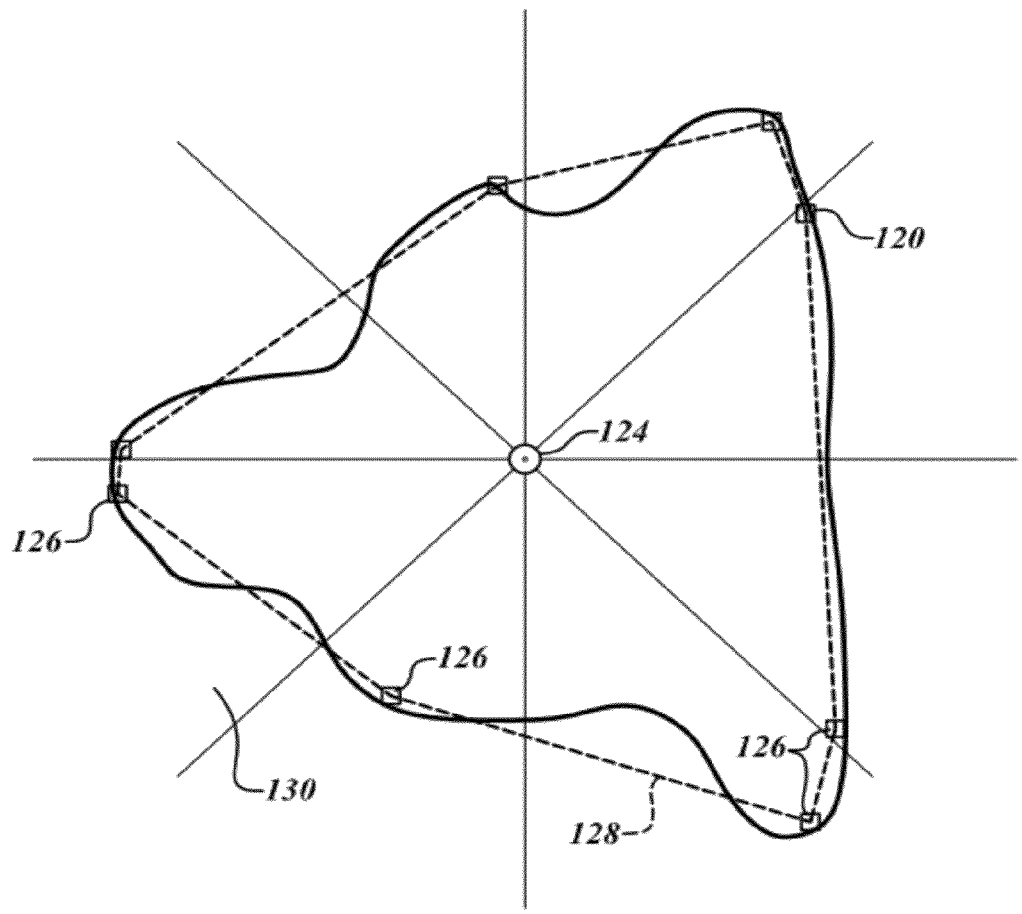
FIGS. 4 and 5 are geometric diagrams that graphical show the process described in FIGS. 2 and 3 with example data.

FIG. 4 shows a hazardous weather shape 120. The image shown in FIG. 4 is preferably not presented for display to a user on a radar display device. First, a center 124 of the shape 120 is determined. Then, the boundaries of the regions are identified. In each region the furthest points 126 of the shape 120 away from the center 124 are determined. A polygon 128 is created by connecting the farthest away points 126 in adjacent regions.

Figure 5:
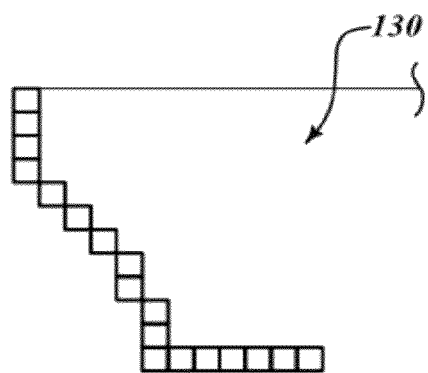

FIG. 5 shows a blown-up view of a region 130 of FIG. 4. The boxes represent pixels at the outer boundary of the shape 120. The pixels in a region are analyzed against the last pixel stored in a furthest away table. If an unanalyzed pixel is further away from the center 124 than the last pixel stored in the furthest away table, the newly analyzed pixel replaces the previous pixel in the table. If the comparison results in a tie upon completion of all the comparisons, then predefined tie breaking rules are applied. An example tie breaking rule is as follows for the region 130:

pixel with the lesser x-axis value wins,
if the x-axis values are equal, then the one with the lesser y-axis value wins.

A multitude of other tie breaking rules/algorithms may be used.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   at a processor
      finding a center of a two-dimensional shape;
      finding furthest away point of the shape in each of a plurality of radially bounded regions sharing the center as a common point; and
      generating a polygon associated with each region based on the associated furthest away point found and associated radials; and
   displaying the generated polygon on a display device.

2. The method of claim 1, wherein the shape is associated with hazardous weather information determined from radar reflectivity data stored in a three-dimensional buffer.

3. The method of claim 2, wherein the display device comprises an aircraft weather radar display.

4. The method of claim 1, wherein generating comprises connecting lines between the furthest away points of adjacent regions.

5. The method of claim 4, wherein the plurality of regions comprise eight regions.

6. The method of claim 4, wherein finding the furthest away point of the shape in a plurality of regions comprises finding at least two furthest away points of the shape in each of the plurality of regions.

7. A system comprising:
   memory comprising a three-dimensional buffer, the memory configured to store radar reflectivity data in the three-dimensional buffer;
   a display device; and
   a processor in data communication with the memory and the display device, the processor comprising:
      a first component configured to find a center of a shape associated with a portion of the data stored in the memory;
      a second component configured to find furthest away point of the shape in each of a plurality of radially bounded regions sharing the center as a common point; and
      a third component configured to generate a polygon associated with each region based on the associated furthest away point found and associated radials,
   wherein the display device is configured to display the generated polygon.

8. The system of claim 7, wherein the shape is associated with hazardous weather information determined from the radar reflectivity data stored in the three-dimensional buffer.

9. The system of claim 8, wherein the display device comprises an aircraft weather radar display.

10. The system of claim 7, wherein the third component is further configured to connect lines between the furthest away points of adjacent regions to generate the polygon.

11. The system of claim 10, wherein the plurality of regions comprise eight regions.

12. The system of claim 10, wherein second component is further configured to find at least two furthest away points of the shape in each of the plurality of regions.

13. A system comprising:
   a means for finding a center of a two-dimensional shape;
   a means for finding furthest away point of the shape in each of a plurality of radially bounded regions sharing the center as a common point; and
   a means for generating a polygon associated with each region based on the associated furthest away point found and associated radials; and a means for displaying the generated polygon on a display device.

14. The system of claim 13, wherein the shape is associated with hazardous weather information determined from radar reflectivity data stored in a three-dimensional buffer.

15. The system of claim 14, wherein the display device comprises an aircraft weather radar display.

16. The system of claim 13, wherein the means for generating connects lines between the furthest away points of adjacent regions.

17. The system of claim 16, wherein the plurality of regions comprise eight regions.

18. The system of claim 16, wherein the means for finding the furthest away point of the shape in a plurality of regions finds at least two furthest away points of the shape in each of the plurality of regions.

* * * * *